(12) United States Patent
Bland

(10) Patent No.: US 8,612,623 B2
(45) Date of Patent: Dec. 17, 2013

(54) PROTECTION OF DELIVERED MEDIA

(75) Inventor: Timothy Neil Bland, Egham (GB)

(73) Assignee: Rovi Technologies Corporation, Santa Clara, CA (US)

( * ) Notice: Subject to any disclaimer, the term of this patent is extended or adjusted under 35 U.S.C. 154(b) by 470 days.

(21) Appl. No.: 12/880,973

(22) Filed: Sep. 13, 2010

(65) Prior Publication Data

US 2012/0066289 A1    Mar. 15, 2012

(51) Int. Cl.
*G06F 15/16* (2006.01)
*H04L 29/06* (2006.01)

(52) U.S. Cl.
USPC ............ 709/231; 709/230; 713/164; 713/165

(58) Field of Classification Search
USPC ...................... 709/230, 231; 713/164, 165
See application file for complete search history.

(56) References Cited

U.S. PATENT DOCUMENTS

| | | | | |
|---|---|---|---|---|
| 7,206,320 | B2 * | 4/2007 | Iwamura | 370/448 |
| 7,584,356 | B2 * | 9/2009 | Suzuki | 713/168 |
| 7,647,557 | B2 * | 1/2010 | Janus | 715/723 |
| 7,716,662 | B2 * | 5/2010 | Seiden | 717/173 |
| 7,912,338 | B2 * | 3/2011 | Seo et al. | 386/241 |
| 2005/0010790 | A1 * | 1/2005 | Lang et al. | 713/193 |
| 2006/0123484 | A1 * | 6/2006 | Babic et al. | 726/26 |
| 2006/0259976 | A1 * | 11/2006 | Thompson et al. | 726/26 |
| 2007/0297759 | A1 * | 12/2007 | Breitfeld et al. | 386/94 |
| 2008/0022125 | A1 * | 1/2008 | Basile | 713/189 |
| 2009/0086966 | A1 * | 4/2009 | Haruki et al. | 380/44 |
| 2010/0042682 | A1 * | 2/2010 | Kaye | 709/203 |
| 2010/0092025 | A1 * | 4/2010 | Folea et al. | 382/100 |
| 2010/0332328 | A1 * | 12/2010 | Dharmaji et al. | 705/14.64 |
| 2011/0055309 | A1 * | 3/2011 | Gibor et al. | 709/202 |
| 2011/0178854 | A1 * | 7/2011 | Sofer et al. | 705/14.4 |
| 2011/0305433 | A1 * | 12/2011 | Singer | 386/248 |

FOREIGN PATENT DOCUMENTS

| | | |
|---|---|---|
| EP | 1 379 084 A1 | 1/2004 |
| EP | 1 734 525 A1 | 12/2006 |

OTHER PUBLICATIONS

Hjelsvold, Rune, et al., "Web-based Personalization and Management of Interactive Video", Proceedings of the Tenth International Conference on World Wide Web, WWW '01, Jan. 1, 2001, pp. 129-139, New York, NY, USA.
International Search Report for International Application No. PCT/US2011/051232, issued Sep. 20, 2012.

* cited by examiner

*Primary Examiner* — Hieu Hoang
(74) *Attorney, Agent, or Firm* — Ropes & Gray LLP

(57) ABSTRACT

Program code in a Web page hosted by a server and/or in server side code executed by the server is specially configured so that a modified media file whose source is embedded in the Web page and which is streamed by the server is properly playable only in browsers of media devices accessing the Web page. Thus, if a copy of the modified media file is downloaded to the media device or otherwise procured, the user of the media device is unable to properly play the downloaded copy by using a conventional media player. Further, if the downloaded copy is shared on a file sharing network, users of the file sharing network that download copies from the media device are also unable to properly play their downloaded copies by using conventional media players.

10 Claims, 7 Drawing Sheets

```
┌─────────────────────────────────────────────┐  ╭─1101
│  SCRAMBLE ORDER OF SCENES IN A MEDIA FILE   │
└─────────────────────────────────────────────┘
                      │
                      ▼                          ╭─1102
┌─────────────────────────────────────────────┐
│   RECORDING STARTING POSITIONS OF SCENES TO │
│           GENERATE SCENES MAP               │
└─────────────────────────────────────────────┘
                      │
                      ▼                          ╭─1103
┌─────────────────────────────────────────────┐
│   GENERATE WEB PAGE AND/OR SERVER SIDE CODE │
└─────────────────────────────────────────────┘
```

PROTECTION OF DELIVERED MEDIA

FIELD OF THE INVENTION

The present invention generally relates to the protection of media files and in particular, to the protection of media files accessible over the Internet.

BACKGROUND OF THE INVENTION

The Internet is increasingly becoming a source of entertainment as well as information. Personal computers and Web connectable portable media devices such as netbooks, smartphones, and tablet computers are capable of playing streamed media such as movies, television shows and other media files from on-line sources for the enjoyment of their users.

OBJECTS AND SUMMARY

One object of one or more aspects of the present invention is a system and method for protecting web based media so that a protected media file is unplayable by unauthorized media players and Web browsers.

Another object of one or more aspects is a system and method for streaming a protected media file for viewing within a standard Web browser, wherein the protected media file is unplayable by standard media players and Web browsers if a complete copy of the protected media file is downloaded.

Still another object of one or more aspects is a system and method for providing a protected media file that is only displayable by a Web browser when the protected media file is streamed to the viewer through a Web page of the provider.

These and additional objects are accomplished by the various aspects, wherein briefly stated, one aspect is a web server comprising: a network interface for communicating with a client device over the Internet; and a processor programmed to establish a connection with the client device over the Internet and transmit a web page to the client device wherein the web page includes a media element corresponding to a media file that has been modified so as to prevent normal playback of the media file and a script to facilitate playing the modified media file in a web browser on the client device.

Another aspect is a web server comprising: a network interface for communicating with a client device over the Internet; and a processor programmed to establish a connection with the client device over the Internet, transmit a web page to the client device wherein the web page includes a media element corresponding to a media file that has been modified so as to prevent normal playback of the media file, and a facilitate playing the modified media file in a web browser on the client device.

Still another aspect is a method for protecting a media file, the method comprising: modifying a media file so as to prevent normal playback of the media file; generating a web page including a video tag identifying a source for the modified media file; and generating computer instructions that facilitate playing the modified media file in a client browser accessing the web page.

Additional objects, features and advantages of the various aspects of the present invention will become apparent from the following description of its preferred embodiment, which description should be taken in conjunction with the accompanying drawings.

DETAILED DESCRIPTION

Figure 1:
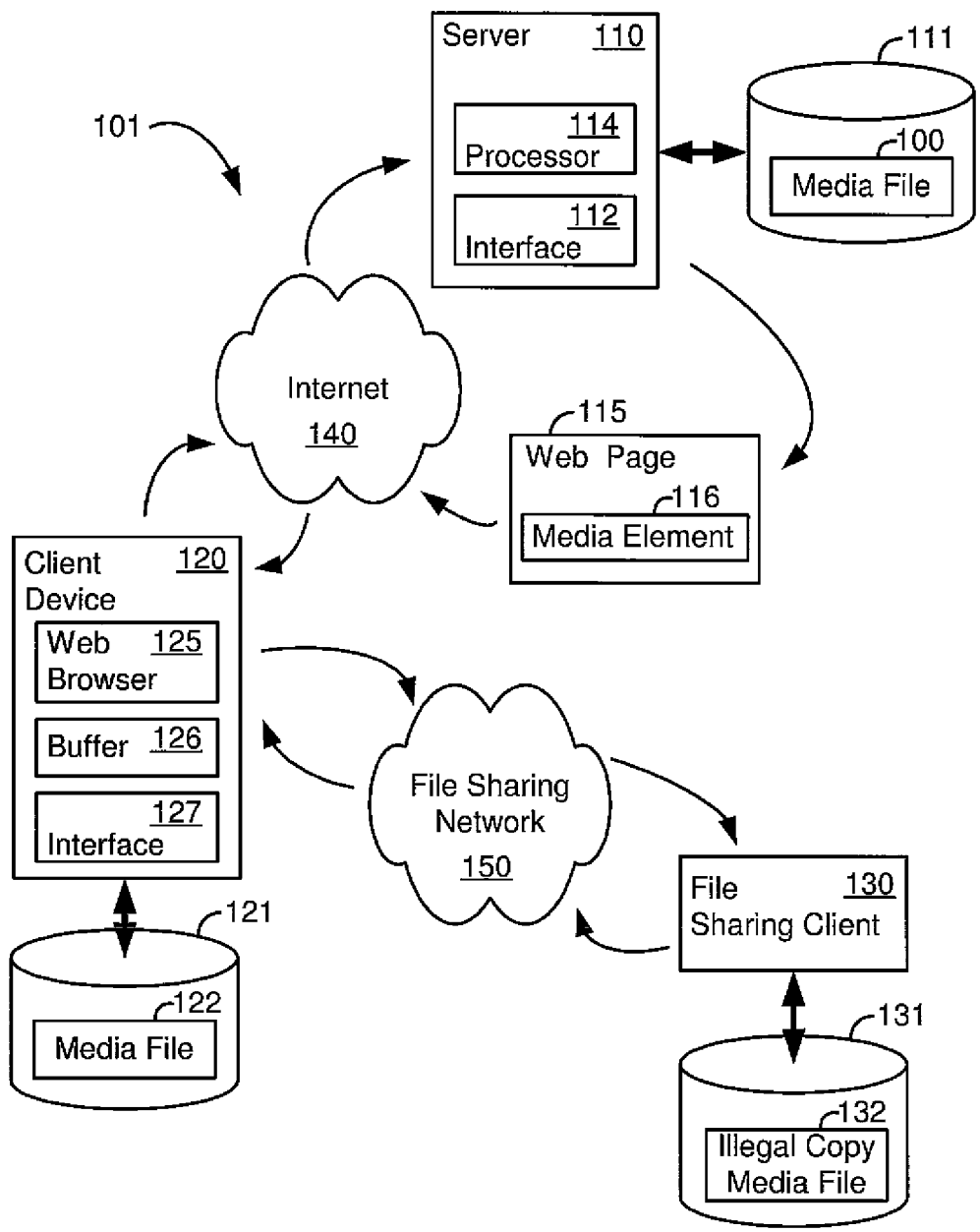
FIG. 1 illustrates a media streaming system.

FIG. 1 illustrates a Web based media streaming system 101 in which a server 110 streams a media file 100 to a client device 120 over the Internet 140 so that the media file 100 is displayed in a Web browser 125 of the client device 120. To contact the server 110, the user inputs in the browser 125 the Uniform Resource Locator (URL) where a Web page 115 hosted by the server 110 is located on the World Wide Web. After a connection is established and the Web page 115 is accessed and displayed on a screen of the client device 120, the user may initiate streaming of the media file 100 or streaming may be automatically initiated. A media element 116 embedded in the Web page 115 indicates a source for the media file 100 that is to be rendered in the browser 125. To access the Internet 140 and communicate with each other, the server 110 has a network interface 112 and the client device 120 has a network interface 127. The media file 100 that is to be streamed by the server 110 is stored on a mass storage unit 111 which is accessible to the server 110. To perform its functions, the server 110 has a processor 114 as well as other conventional components of a computer.

When the media file 100 is streamed to the client device 120 for viewing by a user in the browser 125, a full copy of the media file 100 is generally not stored on the client device 120. Generally, only a limited portion of the media file 100 is stored at any time in a buffer 126 of the client device 120. Once a stored portion of the media file 100 is rendered, it is discarded, e.g., pushed out of the buffer 126 in a first-in-firstout fashion. However, computer programs are available that work with the browser 125 to provide the user of the client device 120 an option to download a full copy of the media file 100. As an example, for Web pages written in HyperText Markup Language 5 (HTML5), the user may download a full copy 122 of the media file 100 to a memory 121 by right-clicking on the display area in which the media file 110 is being rendered and selecting a download option on a pop-up menu.

However, the downloaded copy 122 may be detrimental to the interests of the copyright owner and licensees of the media file 100 since copies of the copy 122 may then be distributed to other parties without compensation to the copyright owner or its licensees. For example, the client device 120 may share the downloaded copy 122 over a file sharing network 150 with other file sharing clients such as a file sharing client 130 which downloads and stores an illegal or unauthorized copy 132 of the copy 122 of the media file 100 in a memory 131 and shares the unauthorized copy 132 in turn with other members of the file sharing network 150. Even if the user of the client device 120 does not share the downloaded copy 121 with other parties, if the owner or licensee has the expectation to be compensated for each viewing of the media file 100, the downloaded copy 122 is also detrimental in that regard since it allows the user of the client device 120 to freely view the unauthorized copy or copies at any time without making such compensation.

Thus protection against unauthorized downloading of streamed media is desirable, but such protection has been found to be problematic. Accordingly, it is desired to develop an improved system and method that protects the legitimate interests of copyright owners and their licensees in conjunction with the streaming of media files to personal computers and portable media devices for viewing by their users.

As used herein, the client device 220 is a representative Internet connectable media device having a Web browser that accesses a Web page hosted by a server and renders or plays a media file specified on the Web page in its Web browser. Examples of such a media device include Internet, network, and/or Web connected personal computers, television sets, set top boxes, and game consoles. Other examples include portable media devices such as netbooks, smartphones, tablet computers, and other hand-held or portable devices.

Figure 2:
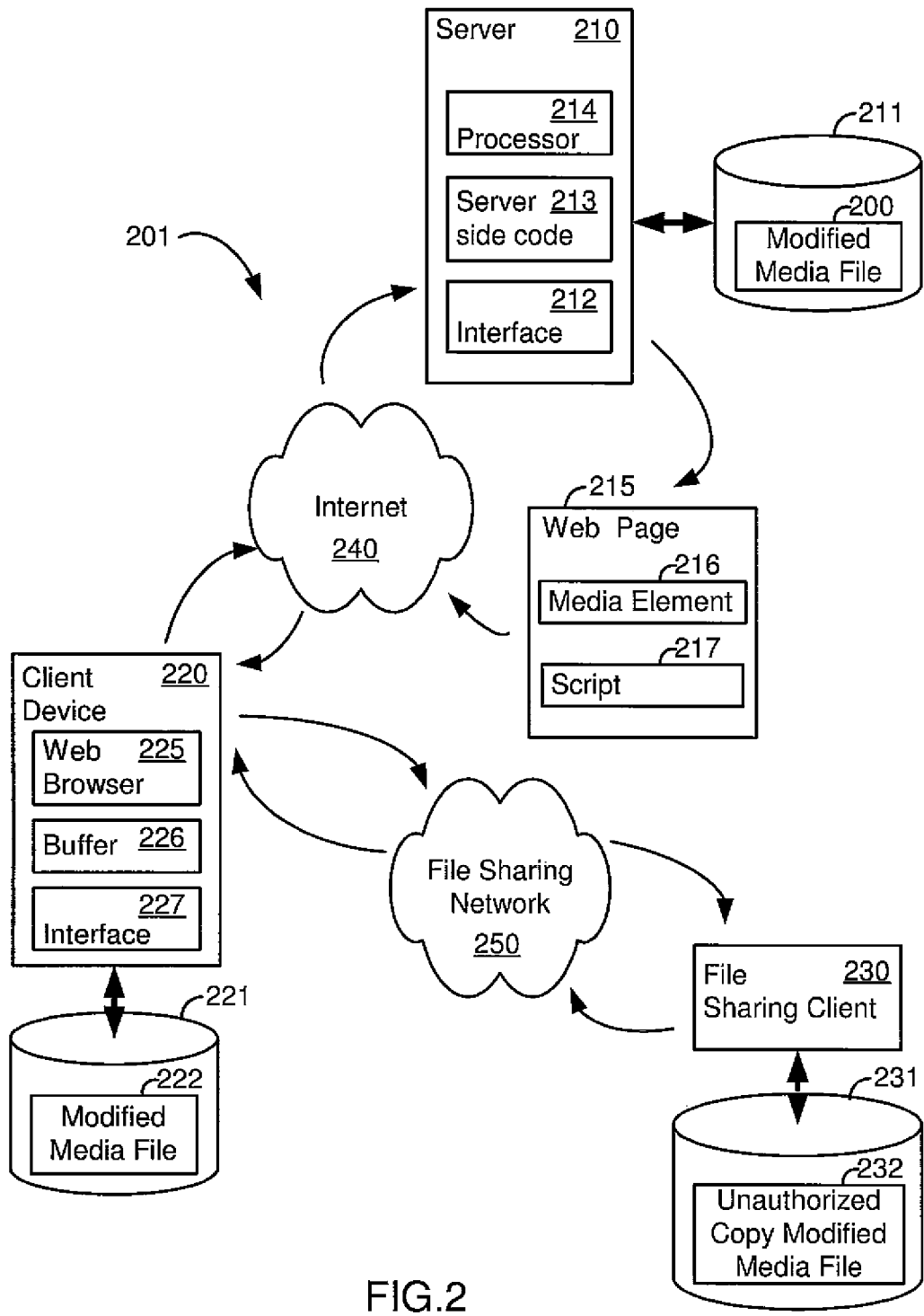
FIG. 2 illustrates a media streaming system utilizing aspects of the invention.

FIG. 2 illustrates, as an example, a diagram of a media streaming system 201 in which a server 210 streams a modified version 200 of the media file 100 of FIG. 1 (the modified version 200 also referred to herein as the "protected media file" or simply the "modified media file") over the Internet 240 for rendering in Web browsers of media devices accessing a Web page 215 hosted by the server 210. An example of such a media device is a client device 220 (which may be generally constructed and operate as the client device 120 previously described in reference FIG. 1). To access the Internet 240 and communicate with each other, the server 210 has a network interface 212 and the client device 220 has a network interface 227. The media file 200 that is to be streamed by the server 210 is stored on a mass storage unit 211 which is accessible to the server 210. To perform its various functions as described herein, the server 210 has a processor 214 as well as other conventional components of a computer.

The modified media file 200 is configured so that it is only playable by the browser 225 accessing the Web page 215. Thus, if a copy 222 of the modified media file 200 is somehow downloaded to the memory 221 of the client device 220, the user of the client device 220 is unable to properly play the downloaded copy 222. Further, if the downloaded copy 222 is shared by the user of the client device 220 on the file sharing network 250, then a user of the file sharing client 230 that downloads and stores in memory 231 an unauthorized copy 232 of the modified media file 222, is also unable to play the downloaded unauthorized copy 232.

Program code in the form of script 217 in the Web page 215 and/or server side code 213 executed by the processor 214 of the server 210 is specially configured to facilitate rendering of the modified media file in the Web browsers accessing the Web page 215. The configuration of the code corresponds to the manner in which the modified media file 200 is constructed as further described below.

The media file 100 of FIG. 1 may be modified in various ways to accomplish the purposes of the present invention. Examples include a first method ("file corruption") described in reference to FIGS. 3-7, a second method ("file splitting") described in reference to FIGS. 8-10, and a third method ("content position scrambling") described in reference to FIGS. 11-12. Each of the methods may be implemented by the server 210 or one or more other computers controlled or otherwise authorized by the copyright owner or one of its licensees to perform one or more blocks of the methods. Although in describing each of the methods, the script 217 is described as being incorporated in the Web page 215, coding may also be incorporated instead of (or in addition to) in server side code 213 for execution by the processor 214 of the server 210 so that the server 210 streams the modified media file in such a fashion that it is properly rendered in the browser 225. The server side code 213 may be written in ASP.NET or PHP, for example. The Active Server Pages web application framework (ASP.NET) provided by Microsoft is a tool for building dynamic web sites, web applications and web services. PHP includes Hypertext PreProcessor or Personal Home Page scripting language for web development to produce dynamic web pages.

Figure 3:
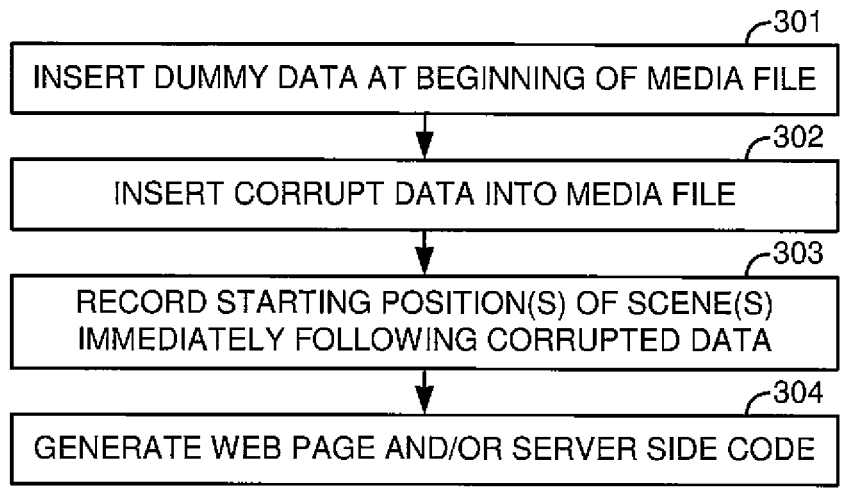
FIG. 3 illustrates a flow diagram of a first method for generating a modified media file and code to render the modified media file in a Web browser, utilizing aspects of the invention.
Figure 4:
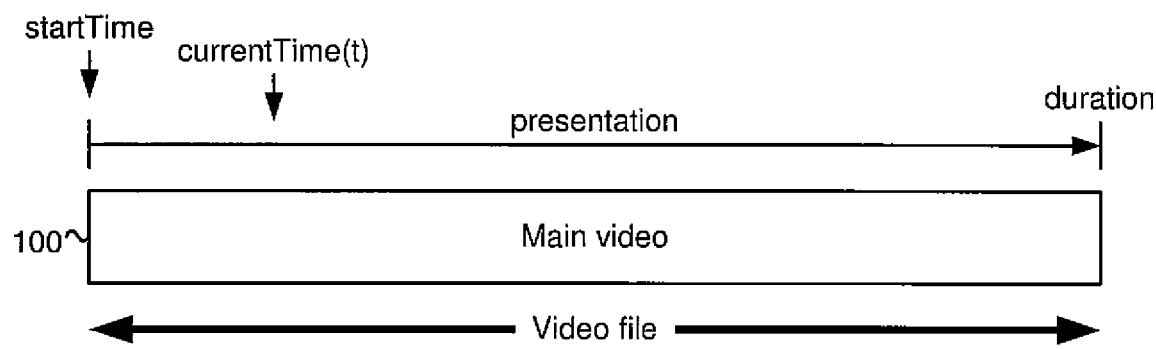
FIG. 4 illustrates a basic structure for a media file.

FIG. 3 illustrates, as an example, a flow diagram of a first method ("file corruption") for generating the modified media file 200 of FIG. 2 from the media file 100 of FIG. 1 and generating the Web page 215 to play the modified media file 200 in a browser 225 of a client device 220. As shown in FIG. 4, the unprotected media file 100 is a conventional video file which includes audio and video data to be presented in a main video section. Data for presenting the time synchronized audio and video is generally provided along with the media file 100 such as the main video section's duration. Also shown in FIG. 4 are pointers used to control the presentation or playing of the media file 100 including, for example, a starting time ("startTime") which normally may be set to zero and a current playing time ("currentTime(t)") which indicates the current place in the presentation, where "t" is preferably a time between startTime and the sum of startTime and duration.

Figure 5:
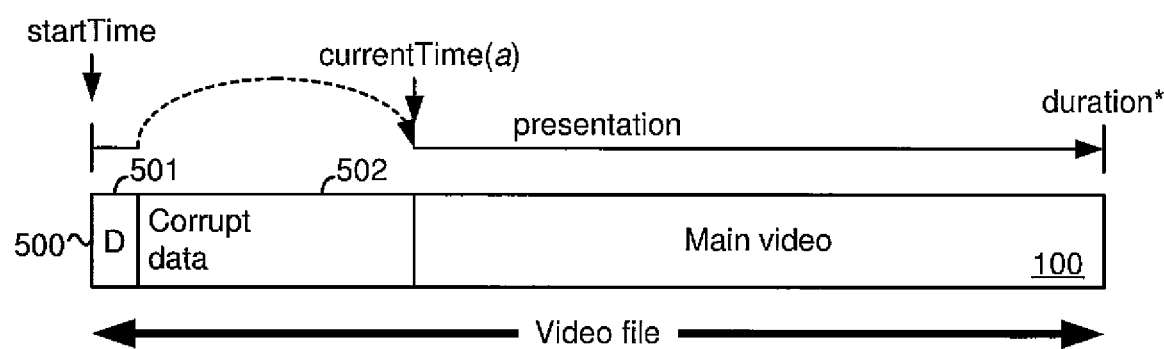
FIG. 5 illustrates a first embodiment of a structure for a modified media file created by the method of FIG. 3, utilizing aspects of the invention.

In block 301 of FIG. 3, dummy data ("D") is inserted at the beginning of the media file 100 such as shown in section 501 of a modified media file 500 in FIG. 5. The amount of dummy data that is inserted is an amount sufficient to cause the Web browser 125 (or a media player) to recognize the modified media file 500 as a suitable piece of content to buffer in and begin playing. Black video is one example of such dummy data.

In block 302, corrupt data is inserted after the dummy data such as shown in section 502 of the modified media file 500 in FIG. 5. The corrupt data is not playable. The amount of corrupt data that is inserted is an amount sufficient to cause a media player trying to play the corrupt data to freeze up or stop. The main video of the media file 100 then follows the corrupt data to form the modified media file 500 such as shown in FIG. 5. Thus, the modified media file 500 is not playable in a linear fashion from its start and an attempt to do so by a media player results in a playing error.

In block 303, the starting position of the first scene of the main video section is recorded as indicated by the pointer to the currentTime(a) as shown in FIG. 5. Note that with the addition of the dummy data 501 and corrupt data 502 before the main video 100, the start of the main video has shifted in time equivalent to the "playing time" of the inserted dummy data and corrupt data. In particular, the starting time ("start-Time") has shifted from the beginning of the main video as shown in FIG. 4 to the beginning of the dummy data as shown in FIG. 5. In addition, the duration of the modified media file 500 is extended (as indicated by its asterisk nomenclature) relative to the unprotected media file 100 to include the durations of the dummy data 501 and corrupt data 502.

In block 304, the Web page 215 is generated so that a browser accessing the Web page 215 may properly render the modified media file 500 for viewing by its user. In particular, it includes both a media element 216 indicating the source location for the modified media file 500 and script 217 for rendering or playing the media file 500 in a browser accessing the Web page 215. The Web page 215 is optionally written in HTML5 and the media element 216 in such cases is an HTML5 video tag. The modified media file 500 may be in an Ogg format, MPEG-4 format, or other suitable format for display across a broad array of media devices. The Ogg format in particular is an open container format that provides for efficient streaming and manipulation of high quality digital multimedia. The Ogg format can multiplex a number of independent streams for audio, video, text (such as subtitles), and metadata. The MPEG-4 format is provided by the Moving Pictures Experts Group and defines a standard for compression and/or coding of audio and video (AV) data. The HTML5 standard supports both the Ogg format and the MPEG-4 format.

The script 217 is preferably written in JavaScript and/or AJAX (Asynchronous JavaScript and XML) to control the rendering of the modified media file 500 in the browser 225. In particular, the script 217 allows the modified media file 500 to be played in a linear fashion in the browser 225 by moving a pointer indicating the current playing time ("currentTime (t)") to skip over the corrupt data 502 to the starting position of the main video section, which was previously recorded in 303 such as, for example, the time "currentTime(a)" shown in FIG. 5. To do this, a combination of seeking and updating the value of the currentTime pointer to currentTime(a) may be performed.

Figure 6:
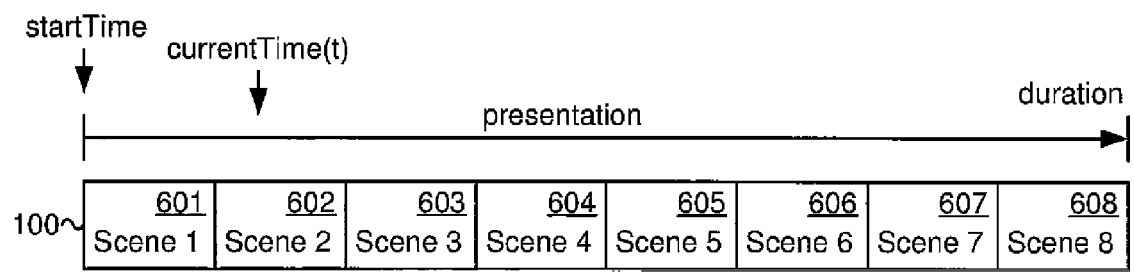
FIG. 6 illustrates a scene structure for a media file.

As a variation of the first method, corrupt data may be inserted not only before a first scene or chapter of the main video, but also at the beginning of other scenes or chapters in the main video as well. For example, as shown in FIG. 6, the main video section may comprise a plurality of scenes 601, 602, 603, 604, 605, 606, 607 and 608. Corrupt data may be inserted before each of the scenes 601-608 or before only selected ones of the plurality of scenes 601-608. Dummy data, on the other hand, need only be inserted once at the beginning of the media file.

Figure 7:
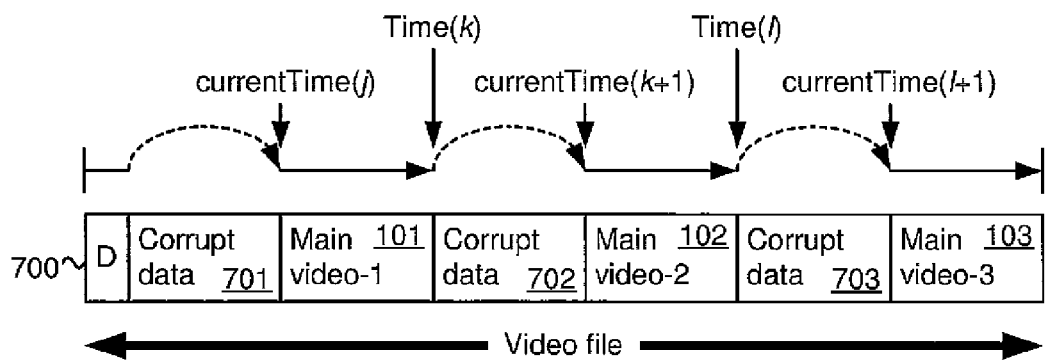
FIG. 7 illustrates a second embodiment of a structure for a modified media file generated by the method of FIG. 3, utilizing aspects of the invention.

FIG. 7 illustrates, as an example, a second embodiment of a modified media file 700 generated by the method of FIG. 3. In generating the modified media file 700, dummy data is inserted at the beginning of the media file in generally the same manner as described in reference to block 301 of FIG. 3. Corrupted data is then inserted before selected scenes of the media file and the starting position for each of the scenes immediately following the corrupt data is recorded in a similar manner as described in reference to block 302 and block 303 of FIG. 3.

The Web page 215 is then generated in a similar manner as described in reference to block 304 of FIG. 3, except the script 217 in this case controls playing of the modified media file 700 so that it skips each of the corrupt data sections 701, 702 and 703. It does this by using the recorded starting positions for each of the scenes immediately following the corrupt data along with known lengths of each of the scenes. For example, referring to FIG. 7, after playing part or all of the dummy data to start the streaming process, the script 217 updates the currentTime pointer so that it points to currentTime(j) and performs a seeking operation to that time to update the position of the playback and skip the corrupt data 701. A first main video portion 101 is then rendered in the browser 225. When the first main video portion 101 ends at Time(k), which is known because the lengths of the one or more scenes in the first main video portion 101 are known, the script 217 updates the currentTime pointer so that it points to currentTime(k+1) and performs a seeking operation to that time to skip the corrupt data section 702. A second main video portion 102 is then rendered in the browser 225. When the second main video portion 102 ends at Time(l), the script 217 updates the currentTime pointer so that it points to currentTime(l+1) and performs a seeking operation to that time to skip the corrupt data section 703. A third and final main video portion 103 is then rendered in the browser 225.

Figure 8:
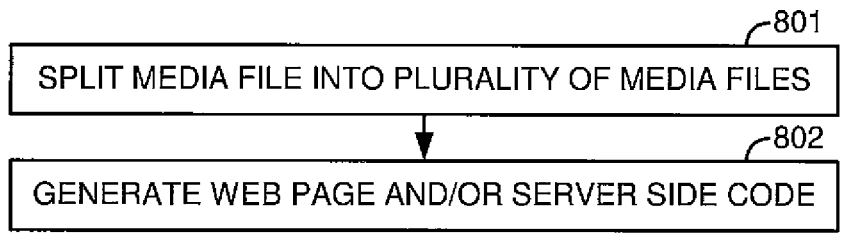
FIG. 8 illustrates a flow diagram of a second method for generating a modified media file and code to render the modified media file in a Web browser, utilizing aspects of the invention.
Figure 9:
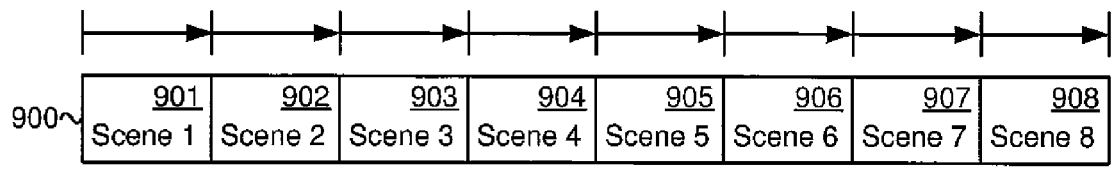
FIG. 9 illustrates an embodiment of a structure for a modified media file generated by the method of FIG. 8, utilizing aspects of the invention.

FIG. 8 illustrates, as an example, a flow diagram of a second method ("file splitting") for generating a modified media file and the Web page 215 to play the modified media file in the browser 225. In block 801, the media file 100 is split into a plurality of media files, each with its own specified starting time and duration as described in reference to FIG. 4. As an example, FIG. 9 illustrates a modified media file 900 which has been split so that each of its scenes 901, 902, 903, 904, 905, 906, 907 and 908 is a separate media file. Splitting within scenes is also possible. Splitting into other types of parts such as chapters, time periods, etc., is also possible.

By splitting the media file 100 into a plurality of media files such as 901-908, when the user of the browser 225 attempts to download the streaming media file 900 as previously described, the user is able to only download the media file that is playing at that time (e.g., one of the media files 901-908). In order to download the complete media file 100, the user must download each of the plurality of media files that it has been split into. Thus, downloading of the complete media file 100 is made more difficult because not only may the user not realize that the media file 100 has been split into a plurality of media files, but also because it may not be clear where the file breaks are, e.g., after which scenes or even possibly within scenes.

In block 802, the Web page 215 is generated so that it includes both a media element 216 indicating the source location for the modified media file 900 and script 217 for rendering the media file 900 in a Web browser accessing the Web page 215. As with the first method, the Web page 215 is optionally written in HTML5 and the media element 216 may include an HTML5 video tag. The modified media file 900 may be in an Ogg format, MPEG-4 format, or other suitable format for display across a broad array of media devices.

The script 217 is preferably written in JavaScript and/or AJAX to cause the browser 225 to render the modified media file 900 in such a fashion that it appears to the user of the client device 220 as one continuous presentation that is seamlessly played one part after another even though the media file has been split into a plurality of media files. Seamlessly in this case means without noticeable delay between media files. One way to do this is to sequentially update the video tag which indicates the source of the media file to be rendered from the first of the plurality of media files to the last of the plurality of media files by using AJAX (Asynchronous JavaScript and XML) so that it isn't necessary to reload the Web page 215 into the browser 225 each time.

Figure 10:
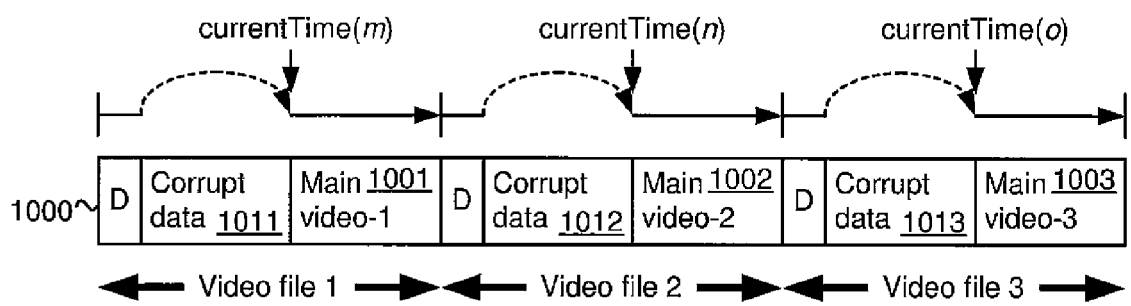
FIG. 10 illustrates an embodiment of a structure for a modified media file generated by combining the methods of FIGS. 3 and 8, utilizing aspects of the invention.

As a variation of this second method, dummy data and corrupt data may both be inserted at the beginning of one or more of the plurality of media files 901-908 in generally the same manner as described in reference to FIG. 5. As an example, FIG. 10 illustrates a modified media file 1000 in which the main video section has been split into three media files 1001, 1002 and 1003, in which dummy data (D) and corrupt data 1011 have been inserted at the beginning of the media file 1001, dummy data (D) and corrupt data 1012 have been inserted at the beginning of the media file 1002, and dummy data (D) and corrupt data 1013 have been inserted at the beginning of the media file 1003.

The Web page 215 in this case may be sequentially updated to include a media element indicating the source of the media file to be rendered using AJAX so that it isn't necessary to reload the Web page 215 into the browser 225 each time. The script 217 would then include currentTime updating and seeking for each of the media files so that the plurality of media files is seamlessly played one after the other in sequence as described in reference to FIGS. 8-9 while skipping the inserted corrupt data as described in reference to FIGS. 3-7.

Figure 11:
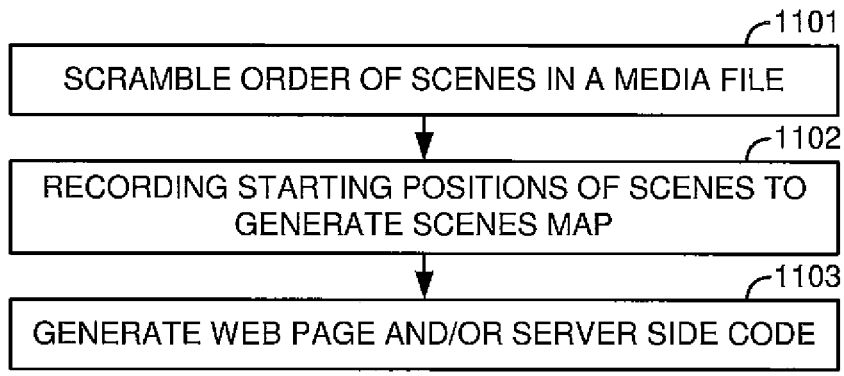
FIG. 11 illustrates a flow diagram of a third method for generating a modified media file and code to render the modified media file in a Web browser, utilizing aspects of the invention.
Figure 12:
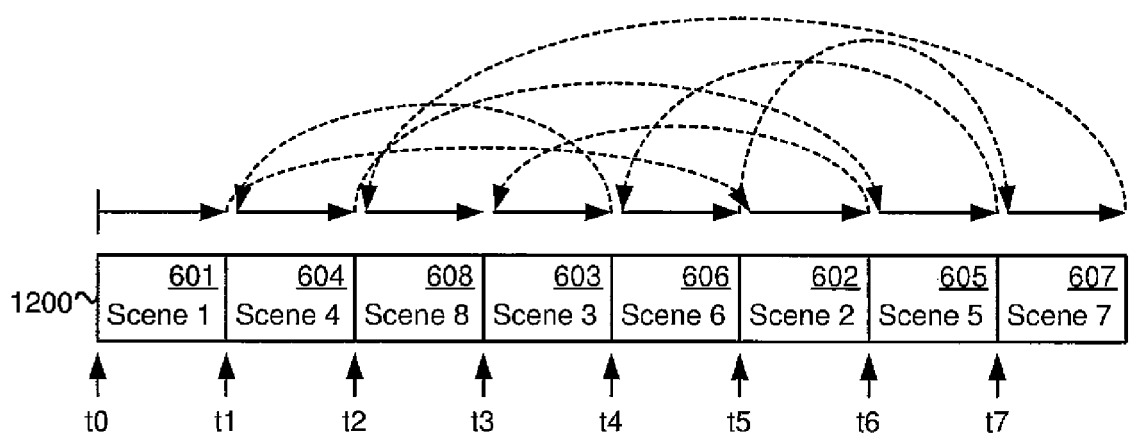
FIG. 12 illustrates an embodiment of a structure for a modified media file generated by the method of FIG. 11, utilizing aspects of the invention.

FIG. 11 illustrates, as an example, a flow diagram of a third method ("content position scrambling") for generating a modified media file and a Web page to play the modified media file in a browser. In 1101, an original organization of scenes as shown in FIG. 9 is scrambled as shown in FIG. 12 so that if a media player were to linearly play the modified media file 1200, the scenes appear out of order. In addition, if the user of the browser 225 downloads the modified media file 1200, the downloaded copy would also be out of sequence. The scrambling in this case may be by pre-arranged order or at random.

In block 1102, the starting position of each scene in the modified media file 1200 is recorded so that a scene map is generated that allows playing the scrambled scenes of the modified media file 1200 in their proper sequence. For example, a scene map corresponding to the modified media file 1200 may be generated as follows:

| Scene | Starting Time |
|---|---|
| Scene 1 | t0 |
| Scene 2 | t5 |
| Scene 3 | t3 |
| Scene 4 | t1 |
| Scene 5 | t6 |
| Scene 6 | t4 |
| Scene 7 | t7 |
| Scene 8 | t2 |

In block 1103, the Web page 215 is generated so that it includes both a media element 216 indicating the source location for the modified media file 1200 and script 217 for rendering or playing the media file 1200 in a browser accessing the Web page 215. As with the first and second methods, the Web page 215 is optionally written in HTML5 and the media element 216 preferably includes an HTML5 video tag. The modified media file 1200 may be in an Ogg format, MPEG-4 format, or other suitable format for display across a broad array of media devices.

The script 217 is preferably written in JavaScript and/or AJAX to cause the browser 225 to render the modified media file 1200 in such a fashion that it appears to the user of the client device 220 as one continuous presentation in the proper scene sequence. To do this, the script 217 uses the scene map to play the scenes in proper sequence without abnormal delay between scenes by updating the currentTime pointer and by using the seeking function in forward and backward directions. Thus, the streamed media transmitted over the Internet 240 from the server 210 to the buffer 226 of the client device 220 is in the proper sequence of scenes as shown in FIG. 6 rather than the scrambled sequence of the modified media file 1200 as shown in FIG. 12.

Figure 13:
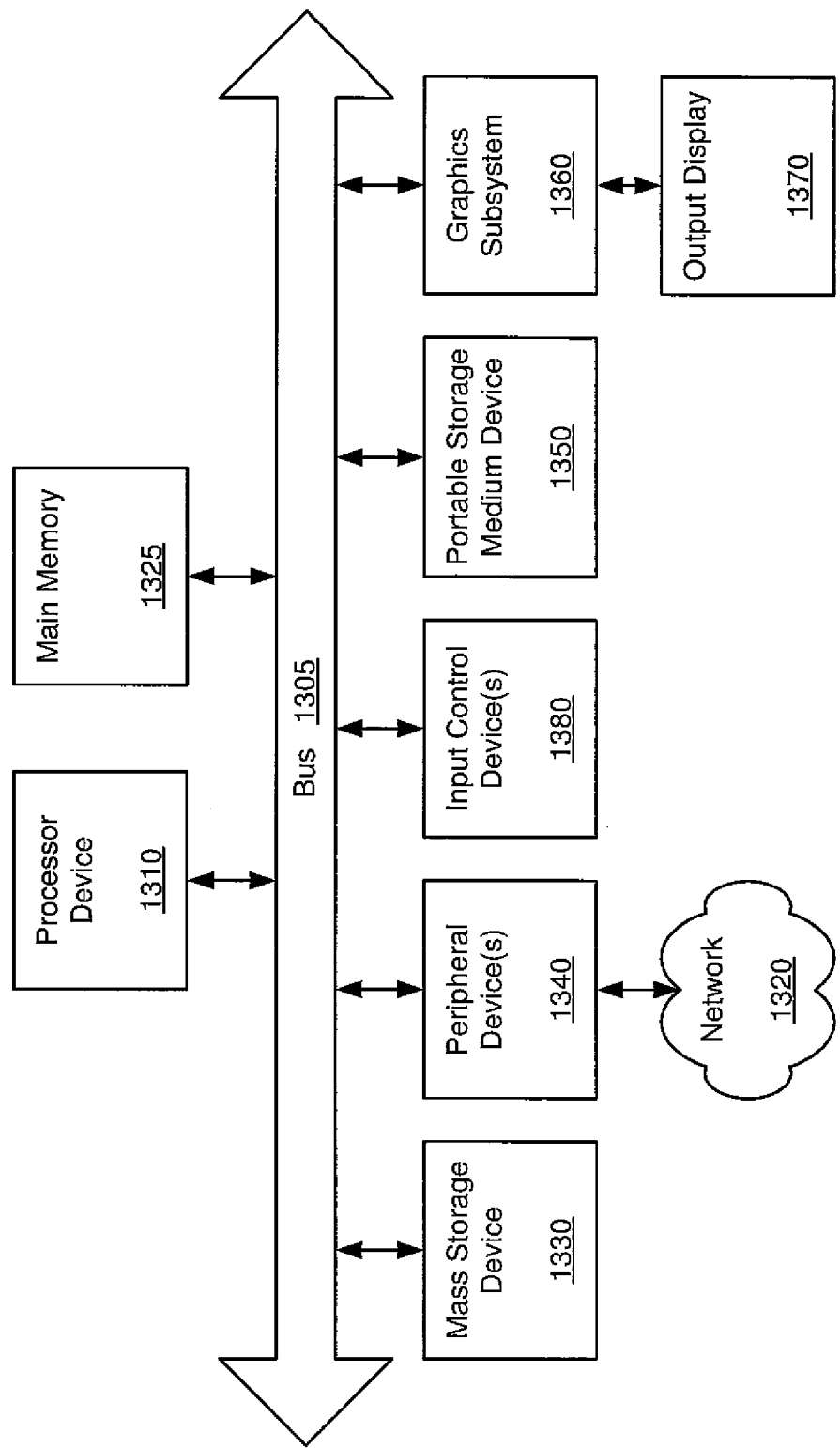
FIG. 13 illustrates a block diagram of a general purpose computer system which may be used for implementing various aspects of the invention.

FIG. 13 illustrates, as an example, a block diagram of a general and/or special purpose computer 1300, in accordance with some embodiments. Examples of the computer 1300 include a user device, a user computer, a client computer and/or a server computer, among other things, such as without limitation a Blu-ray Disc player, a personal media device, a portable media player, an iPod™, a Zune™ Player, a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system. It is to be appreciated that although the computer 1300 is illustrative of an example of the client device 220 and/or server 210, neither the client device 220 nor server 210 is limited in any way to the exact structure as shown and described in reference to the computer 1300 herein.

The computer 1300 preferably includes without limitation a processor device 1310, a main memory 1325, and a bus 1305. The processor device 1310 may include without limitation a single microprocessor, or may include without limitation a plurality of microprocessors for configuring the computer 1300 as a multi-processor system. The main memory 1325 stores, among other things, instructions and/or data for execution by the processor device 1310. If the system is partially implemented in software, the main memory 1325 stores the executable code when in operation. The main memory 1325 may include banks of dynamic random access memory (DRAM), as well as cache memory.

The computer 1300 may further include a mass storage device 1330, peripheral device(s) 1340, portable storage medium device(s) 1350, input control device(s) 1380, a graphics subsystem 1360, and/or an output display 1370. For explanatory purposes, all components in the computer 1300 are shown in FIG. 13 as being coupled via the bus 1305. However, the computer 1300 is not so limited. Devices of the computer 1300 may be coupled through one or more data transport means. For example, the processor device 1310 and/or the main memory 1325 may be coupled via a local microprocessor bus. The mass storage device 1330, peripheral device(s) 1340, portable storage medium device(s) 1350, and/or graphics subsystem 1360 may be coupled via one or more input/output (input/output) buses. The mass storage device 1340 is preferably a nonvolatile storage device for storing data and/or instructions for use by the processor device 1310. The mass storage device 1330, which may be implemented, for example, with a magnetic disk drive or an optical disk drive. In a software embodiment, the mass storage device 1330 is preferably configured for loading contents of the mass storage device 1330 into the main memory 1325.

The portable storage medium device 1350 operates in conjunction with a nonvolatile portable storage medium, such as, for example, a compact disc read only memory (CD ROM), to input and output data and code to and from the computer 1300. In some embodiments, the software for generating a synthetic table of contents is stored on a portable storage medium, and is inputted into the computer 1300 via the portable storage medium device 1350. The peripheral device(s) 1340 may include any type of computer support device, such as, for example, an input/output (input/output) interface configured to add additional functionality to the computer 1300. For example, the peripheral device(s) 1340 may include a network interface card for interfacing the computer 1300 with a network 1320.

The input control device(s) 1380 provide a portion of the user interface for a user of the computer 1300. The input control device(s) 1380 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer 1300 preferably includes the graphics subsystem 1360 and the output display 1370. The output display 1370 may include a cathode ray tube (CRT) display and/or a liquid crystal display (LCD). The graphics subsystem 1360 receives textual and graphical information, and processes the information for output to the output display 1370.

Each component of the computer 1300 may represent a broad category of a computer component of a general and/or special purpose computer. Components of the computer 1300 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments are implemented by the preparation of application-specific integrated circuits and/or by coupling an appropriate network of conventional component circuits.

Some embodiments include a computer program product. The computer program product may be a storage medium and/or media having instructions stored thereon and/or therein which can be used to control, or cause, a computer to perform any of the processes of the invention. The storage medium may include without limitation floppy disk, mini disk, optical disc, Blu-ray Disc, DVD, CD-ROM, microdrive, magneto-optical disk, ROM, RAM, EPROM, EEPROM, DRAM, VRAM, flash memory, flash card, magnetic card, optical card, nano systems, molecular memory, integrated circuit, RAID, remote data storage/archive/warehousing, and/or any other type of device suitable for storing instructions and/or data.

Stored on any one of the computer readable medium and/or media, some implementations include software for controlling both the hardware of the general and/or special computer or microprocessor, and for enabling the computer and/or microprocessor to interact with a human user and/or another mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above. The processes described above may include without limitation the operations described with reference to FIGS. 3-12.

Although the various aspects of the present invention have been described with respect to a preferred embodiment, it will be understood that the invention is entitled to full protection within the full scope of the appended claims.

What is claimed is:

1. A server comprising:
a network interface for communicating with a client device over the Internet; and
a processor programmed to:
split a media file into a plurality of scenes;
scramble the plurality of scenes to create a modified media file;
store a correct playing order of the plurality of scrambled scenes in a script;
establish a connection with the client device over the Internet;
transmit a web page to the client device wherein the web page includes a media element corresponding to the modified media file; and
transmit the script to the client device to facilitate playing the plurality of scenes in the modified media file in the correct playing order in a browser on the client device.

2. The server according to claim 1, further comprising a storage device for storing the modified media file.

3. The server according to claim 1, wherein the client device is a personal computer.

4. The server according to claim 1, wherein the client device is a portable media device.

5. The server according to claim 1, wherein the web page is an HTML5 document.

6. The server according to claim 5, wherein the media element is a video tag.

7. The server according to claim 1, further comprising generating one or more pointers indicating times within duration of the modified media file to compensate for non-linearity of the modified media file so as to facilitate playing the modified media file in the web browser of the client device.

8. The server according to claim 7, wherein the one or more pointers are used by the script.

9. The server according to claim 7, wherein the modified media file further includes one or more non-playable corrupted areas within the modified media file and the script facilitates skipping the non-playable corrupted areas while playing the modified media file in the browser of the client device.

10. A method for protecting a media file, the method comprising:
splitting, by a processor, a media file into a plurality of scenes;
scrambling, by the processor, the plurality of scenes to create a modified media file;
storing a correct playing order of the plurality of scrambled scenes in a script;
generating a web page including a media element corresponding to the modified media file; and
generating computer instructions corresponding to the script to facilitate playing the plurality of scenes in the modified media file in the correct playing order in a browser accessing the web page.

* * * * *